(12) United States Patent
Bilak et al.

(10) Patent No.: US 8,104,896 B1
(45) Date of Patent: Jan. 31, 2012

(54) DIGITAL PAINT PROJECTION METHOD AND APPARATUS

(75) Inventors: Mark Ronald Bilak, Fuquay-Varina, NC (US); Ronald Edward Bilak, Seneca Falls, NY (US)

(73) Assignee: B&B Innovators, LLC, Fuquay-Varina, NC (US)

( * ) Notice: Subject to any disclaimer, the term of this patent is extended or adjusted under 35 U.S.C. 154(b) by 616 days.

(21) Appl. No.: 12/239,728

(22) Filed: Sep. 26, 2008

(51) Int. Cl.
*G03B 21/14* (2006.01)
*G09G 5/02* (2006.01)
*G06K 9/00* (2006.01)

(52) U.S. Cl. ............. 353/31; 353/69; 345/593; 345/1.2; 382/165

(58) Field of Classification Search .................... 353/31, 353/69; 345/593, 1.2; 382/165, 162
See application file for complete search history.

(56) References Cited

U.S. PATENT DOCUMENTS

| 6,924,817 | B2 | 8/2005 | Rice et al. |
| 7,184,054 | B2 | 2/2007 | Clark |
| 7,187,343 | B2 * | 3/2007 | Pate .............................. 345/1.2 |
| 2004/0012542 | A1 | 1/2004 | Bowsher et al. |
| 2004/0078299 | A1 | 4/2004 | Down-Logan et al. |
| 2005/0231576 | A1 | 10/2005 | Lee et al. |
| 2007/0143082 | A1 | 6/2007 | Degnan |
| 2007/0188512 | A1 * | 8/2007 | Ramirez ....................... 345/593 |

OTHER PUBLICATIONS

Kuehni, "Color Spaces," www4.ncsu.edu/~rgkuehni/PDFs/ColSp.pdf, Oct. 30, 2003.

* cited by examiner

*Primary Examiner* — Georgia Y Epps
*Assistant Examiner* — Magda Cruz

(57) ABSTRACT

According to an embodiment, a color is projected onto a surface. An estimate of the surface color is processed and a projection color is selected as a function of the surface color estimate and a chosen color so that the projection color yields the chosen color or a color substantially similar to the chosen color when projected onto the surface. The projection color can then be projected onto the surface for display.

20 Claims, 4 Drawing Sheets

DIGITAL PAINT PROJECTION METHOD AND APPARATUS

BACKGROUND

The present invention generally relates to projecting colors onto a surface, and particularly relates to compensating for the surface color when projecting colors onto the surface.

Selecting a new paint color can be frustrating and prone to error. New paint colors are typically chosen based on paint chip samples placed on a card. The chip samples are small and difficult to visualize on walls or in rooms. Also, a paint color chosen based on a chip sample often does not exactly match the original color of the chip sample. Another option for visualizing paint color is to purchase one or more small paint samples. However, this is a permanent option and cannot be undone once the paint has dried on a wall or other surface. Some paint vendors and retailers offer virtual paint samples on their websites for viewing. A user can select one or more paint colors and see how the selected colors look in different "virtual" rooms. The user can also provide a digital picture of a room and modify the paint color in the digital picture by selecting a different wall color.

These types of "virtual" and digital solutions depend on the color settings applied to the user's computer monitor or digital camera screen and can severely distort the paint color. Moreover, conventional "virtual" and digital paint solutions do not capture the actual lighting conditions within the room to be painted. The perceived color of paint can change drastically in different lighting conditions due to the absorptive/reflective characteristics of the pigments in paint. Accordingly, a color that appears appealing when displayed on-line or on a digital camera screen may be unacceptable when actually painted on a wall. In addition, viewing paint colors on-line or on a camera screen prevents the user from viewing the paint color on a larger surface. For example, viewing size is limited to the size of a computer monitor or even smaller when viewed on the display screen of a digital camera.

SUMMARY

According to an embodiment, an apparatus includes a projector and an integrated circuit. The projector is configured to project one or more colors onto a surface. The integrated circuit is associated with the projector and configured to process an estimate of a color of the surface and select a projection color as a function of the surface color estimate and a chosen color so that the projection color yields the chosen color or a color substantially similar to the chosen color when projected onto the surface by the projector.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
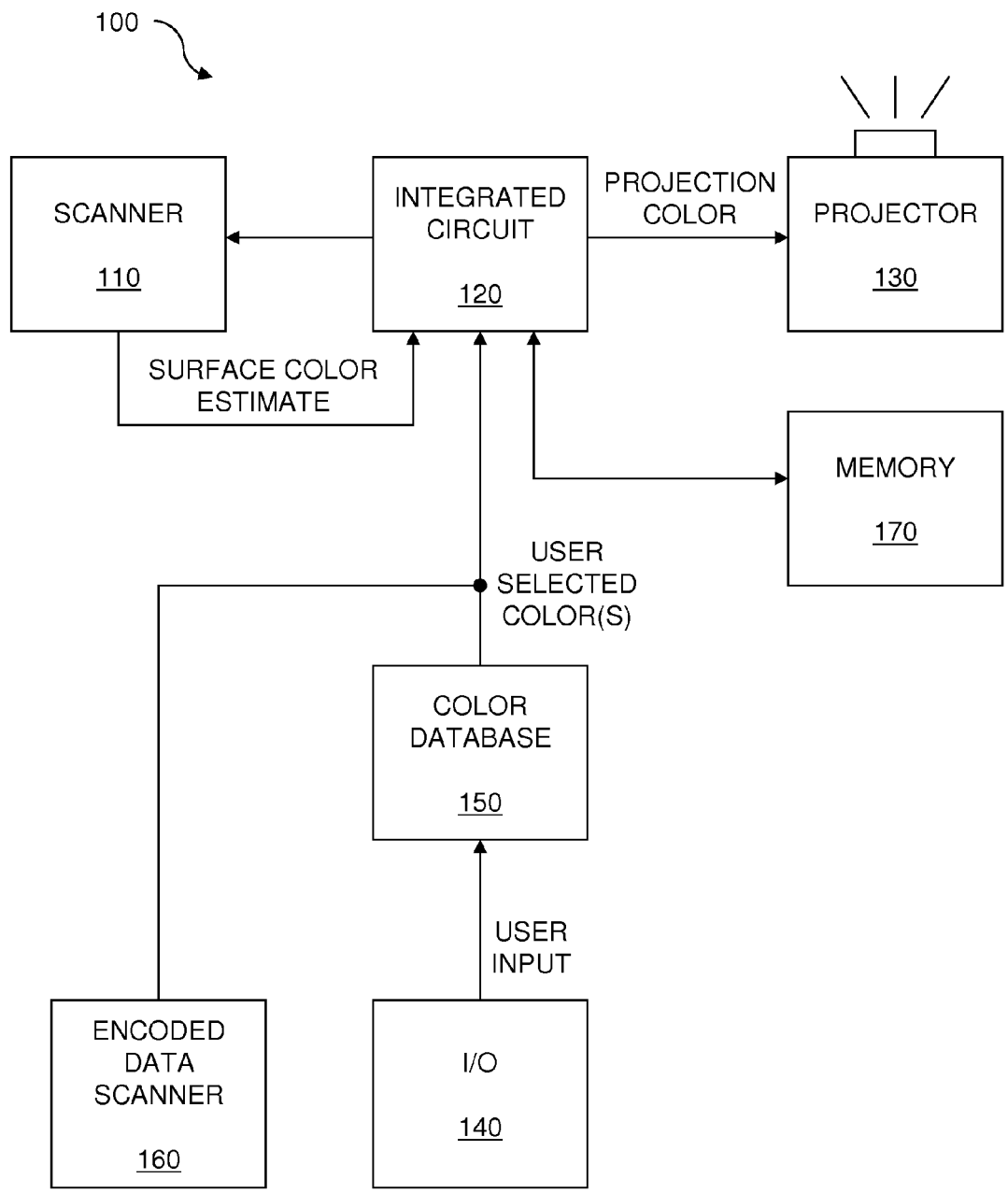
FIG. 1 is a block diagram of an embodiment of an apparatus for projecting colors onto a surface.

FIG. 1 illustrates an embodiment of an apparatus 100 for enabling a user to choose a color such as paint or stain color and projecting the chosen color onto a surface such as a wall, ceiling, floor, furniture, etc. for viewing. The apparatus 100 enables the user to observe how one or more different colors appear on the surface without having to actually paint or stain the surface before making a final color decision. However, the surface may be non-neutral. That is, the surface may be painted, stained or have some other type of covering that interacts with light projected onto the surface. The surface color affects how the projected color is reflected off the surface. For example, if the surface is painted red, pigments in the red paint change the way in which light is reflected off the surface as a result of selective color absorption. The pigments tend to absorb non-red light wavelengths and reflect red light wavelengths. The apparatus 100 counteracts this affect by accounting for the surface color when projecting a color onto the surface so that the color appears the same or similar to the color chosen by the user when projected onto the surface. Otherwise, the color viewed by the user will look different than the chosen color.

In one embodiment, the apparatus 100 includes a scanner 110 for scanning at least a portion of the surface. The scanner 110 is placed in contact or near contact with the surface and the surface is then scanned. This way, an accurate estimate of the surface color can be generated without substantial interference, e.g., from natural or artificial light. In one embodiment, the scanner 110 is a handheld or portable scanner. In another embodiment, the scanner 110 is a digital camera scanner. The scanner 110 may include a charge-coupled device (CCD), contact image sensor (CIS) or any other suitable imaging device for scanning at least a portion of the surface and estimating the surface color based on the scanning results. In another embodiment, a sample of the surface is analyzed by another type of device such as a spectrophotometer or the like to determine the surface color and the surface color is then provided to the apparatus 100, e.g., by being uploaded or otherwise transferred to the apparatus 100. In each embodiment, the apparatus 100 processes the surface color estimate, e.g., illustrated by Step 200 of FIG. 2

In each embodiment, the surface color estimate is represented in a predetermined color space. The surface color estimate can be represented in any suitable color space such as, e.g., CIE, RGB, L*a*b (also referred to as CIELAB), YIQ, YUV, YDbDr, YPbPr, YCbCr, xvYCC, HSL/HSV, CMYK, Munsell, Natural Color System (NCS), Pantone Matching System (PMS), RAL, etc. Each color space has a color model and a specific mapping of the model onto a reference color space, e.g., an absolute color space. Each color model is an abstract mathematical expression describing the way colors can be represented as tuples of numbers, typically as three or four values or color components. The mapping function between a color model and a certain reference color space results in a definite gamut within the reference color space. The gamut is a subset of colors which can be accurately represented in a particular color space.

In one embodiment, the surface color estimate is represented in a color space by assigning values to the X, Y and Z axis of the representation. For example, the scanner 110 or other device can assign a particular amount of magenta to the X axis, cyan to the Y axis and yellow to the Z axis in the CMYK color space. The resulting 3-D space provides a unique position for every possible color that can be created by combining these three pigments. Alternatively, colors can be defined in the RGB (red, green and blue) color space by assigning the appropriate intensity of red, green and blue to the X, Y and Z axes, respectively. In yet another embodiment, the scanner 110 can generate a surface color estimate in the HSV color space using hue (X axis), saturation (Y axis), and a brightness value (Z axis) to represent the scanned surface color. Many color spaces can be represented as three-dimensional (X, Y, Z) values. Other color spaces may have more or fewer dimensions and still other color spaces can be represented with other models. In each case, an estimate of the surface color is generated in a particular color space by the scanner 110 or other device.

Figure 2:
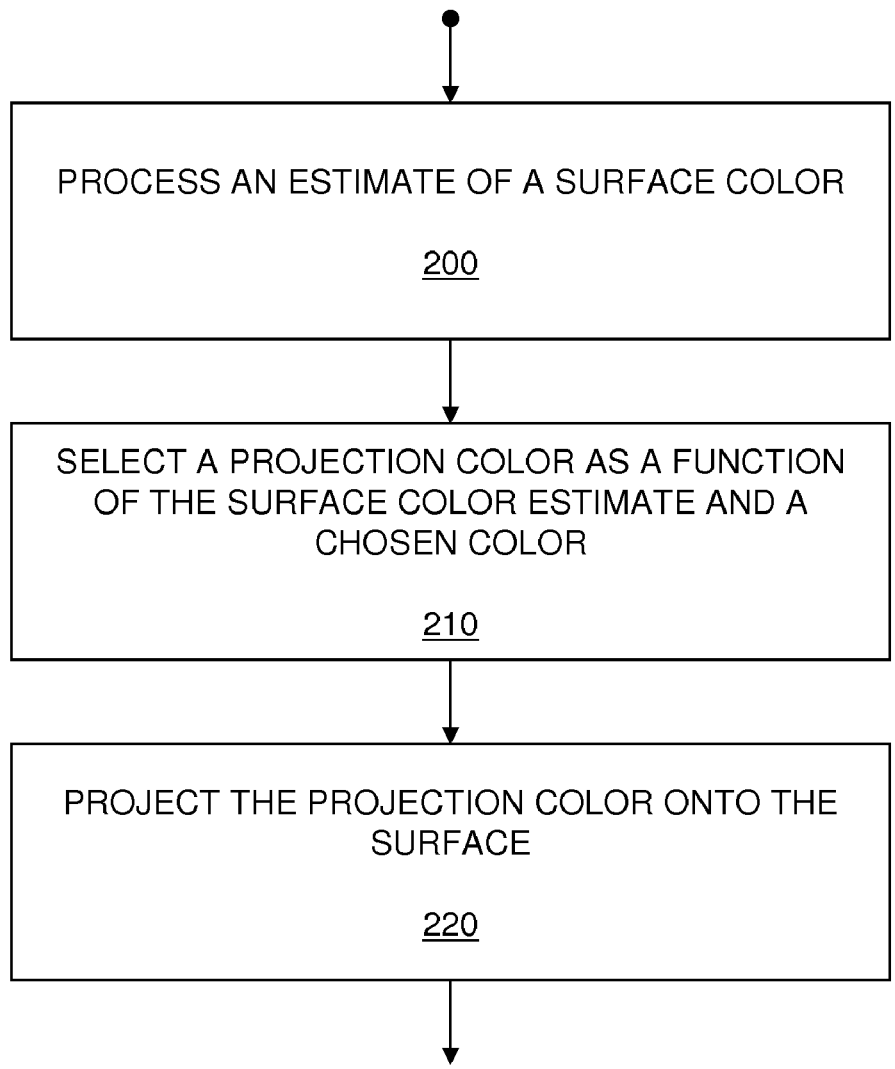
FIG. 2 is a flow diagram of an embodiment of a method for projecting colors onto a surface.

The apparatus 100 also includes an integrated circuit 120 for selecting a projection color as a function of the surface color estimate and a color chosen by a user of the apparatus 100 so that the projection color yields the chosen color or a color substantially similar to the chosen color when projected onto the surface, e.g., as illustrated by Step 210 of FIG. 2. Depending on the available color gamut, the projection color may identically match the chosen color when projected onto the surface or be slightly different. Accordingly, a user of the apparatus 100 is able to view the exact color he or she selected or a close approximation thereof. In one embodiment, the integrated circuit 120 is a processor. In another embodiment, the integrated circuit 120 is an ASIC (application-specific integrated-circuit). The integrated circuit 120 can be any other type of electronic component for processing colors such as a custom logic circuit, digital signal processor, etc.

The integrated circuit 120 analyzes the surface color estimate and a user-chosen color to determine an appropriate projection color. In one embodiment, the surface color estimate and the chosen color are converted to the same color space for analysis. The integrated circuit 120 can convert the surface color estimate from its color space to the color space associated with the user-chosen color or vice-versa. Alternatively, the integrated circuit 120 can convert both color spaces to a standard color space, e.g., an absolute color space. In each case, color space conversion can be performed using any suitable conversion or mapping algorithm, e.g., in accordance with specifications published by the International Color Consortium (e.g., ICC.1:2004-10), the International Commission on Illumination (e.g., CIE76, CIE94 or CIEDE2000), the Colour Measurement Committee of the Society of Dyers and Colourists (e.g., CMC I:c (1984)) or any other color space mapping or conversion algorithm.

The integrated circuit 120 converts the surface color estimate and/or the user-chosen color by translating the representation of a color from one basis to another. In one embodiment, the integrated circuit 120 converts a color represented in one color space to another color space while making the translated color look as similar as possible to the original color. A color in one absolute color space can be converted into another absolute color space and back again. However, some color spaces may have gamut limitations. That is, not all colors of interest can be represented. Under these conditions, the integrated circuit 120 can extrapolate between data values when converting a color that lies outside a particular gamut to produce an approximation of the original color in the new color space.

The integrated circuit 120 can implement any set of rules for converting colors from one color space to another. For example the HSL and HSV color spaces are mappings of the RGB absolute color space. Both are non-absolute, but converting a color between the HSL and HSV color spaces maintains the same color. In one embodiment, the surface color estimate generated by the scanner 110 or other device is in a non-paint color space such as RGB, CMYK, HSL, HSV, etc. The integrated circuit 120 converts the surface color estimate from the non-paint color space to a paint color space such as RAL, PMS, etc. For example, any suitable RGB-to-RAL color conversion algorithm can be used. The color chosen by a user is also represented in the same paint color space.

In one embodiment, the integrated circuit 120 analyzes the different colors in the same paint color space to determine a projection color that appears identical or very similar to the color chosen by the user when projected onto the surface. For purely illustrative purposes, consider a surface painted green. The pigments in the green paint absorb non-green light wavelengths and reflect green light wavelengths. Accordingly, the color chosen by a user will appear different when projected onto the surface because of the color absorption/reflection properties of the green paint unless the integrated circuit 120 performs color compensation. Accordingly, the projection color selected by the integrated circuit 120 for display on the colored surface is a function of both the user-chosen color and the surface color estimate so that the projection color looks the same or nearly similar to the chosen color when projected onto the colored surface. Again considering the purely illustrative example discussed above, a user may choose a pure cyan color for display on the green surface. Pure cyan in the RGB color space corresponds to green and blue light of equal intensity with no red light component (R=0, G=255, B=255). However, the surface color is green and thus absorbs light of non-green wavelengths and reflects green light. Thus, the chosen color (pure cyan) will appear much greener than expected when projected onto the surface without color compensation.

The integrated circuit 120 performs color compensation in this example by computing a projection color as a function of the surface color (green) and the user-chosen color (cyan) based on the known characteristics of the RGB color space and how a green surface color absorbs and reflects light of different wavelengths. For example, the integrated circuit 120 can decrease the green light intensity and/or increase the red light intensity in any suitable combination and by any sufficient amount in the above example so that the projection color looks the same or similar to pure cyan when projected onto the green surface. The amount and type of color compensation performed by the integrated circuit 120 depends on the color chosen by the user, the surface color estimate and the color space in which the colors are analyzed. The known color characteristics and color model associated with a particular color space in conjunction with how a surface painted a particular color absorbs and reflects light of different wavelengths are used to determine a projection color that looks the same or similar to a user-chosen color when projected onto the colored surface.

The integrated circuit 120 may generate the projection color in different ways depending on the color space under consideration. This may involve adjusting primary or secondary color light intensity for the RGB or CMYK color spaces as previously described above. Other parameters such as color shading, hue/saturation, hue/saturation/brightness, hue/saturation/luminance, hue/saturation/intensity, hue/saturation/darkness, luminance/chrominance, etc. may also be adjusted depending on the color space under consideration. In each case, the integrated circuit 120 selects a projection color that yields the user-chosen color or a color substantially similar to the user-chosen color when projected onto the surface.

In one embodiment, the integrated circuit 120 uses a subtractive color model such as CMYK to select the projection color. The basic colors for paint are magenta, cyan and yellow. A subtractive color model is based on the principle that more light is absorbed and less is reflected by adding additional paint color (magenta, cyan and/or yellow), causing the color to appear darker. Particularly, yellow pigment absorbs blue and reflects red and green. Cyan absorbs red and reflects green and blue. Magenta absorbs green and reflects red and blue. Blue absorbs red and green and reflects blue. Red absorbs blue and green and reflects red. Green absorbs blue and red and reflects green. The integrated circuit 120 uses the known characteristics of the subtractive color model to determine the projection color as a function the surface color estimate and a color chosen for display on the surface. For example, if the surface color estimate is cyan, the integrated circuit 120 selects magenta for the projection color when a blue paint color is chosen for display (adding magenta to cyan creates a blue hue). In another example, the integrated circuit 120 selects cyan as the projection color when the surface color estimate is yellow and green is chosen for display (adding cyan to yellow creates a green hue). The integrated circuit 120 can adjust the intensity of any color available in the subtractive model in any suitable way to minimize the visual difference between user-chosen color and the color selected by the integrated circuit 120 when the color is projected onto a colored surface.

Alternatively, the integrated circuit 120 can use an additive color model such as RGB to select the projection color. A color becomes paler and closer to white in an additive color model by adding more colors. Particularly, green combined with red creates yellow, green mixed with blue makes cyan and red plus blue yields magenta. White is created by combining red, blue and green. The integrated circuit 120 uses the known characteristics of the subtractive color model to determine the projection color as a function the surface color estimate and a color chosen for display on the surface. For example, the projection color selected by the integrated circuit 120 may be set to blue when the surface color estimate is red and the user chooses magenta for display. This way, the user sees a magenta hue when a blue image is projected onto the red surface. In yet another embodiment, the integrated circuit 120 can use a subtractive color model to analyze how a colored surface absorbs different wavelengths of light and an additive color model to determine how light reflected of the colored surface is processed by the human eye and visualized by the brain.

In still another embodiment, each color has a complementary color both of which have the opposite hue in the same color model. Two colors are complementary if they produce a neutral color such as grey, white, or black when mixed in proper proportion. The integrated circuit 120 determines the complimentary colors associated with the surface color estimate so that they produce white when combined. The color chosen by the user is then added to the combined complimentary color to form the projection color. The integrated circuit 120 can use any linear or non-linear color model/algorithm to select the projection color so that the projection color yields the chosen color or a color substantially similar to the chosen color when projected onto the surface. In yet another embodiment, the integrated circuit 120 accesses a table stored in memory 170 that contains predetermined color projection information for a range of surface color and paint color options.

Figure 3:
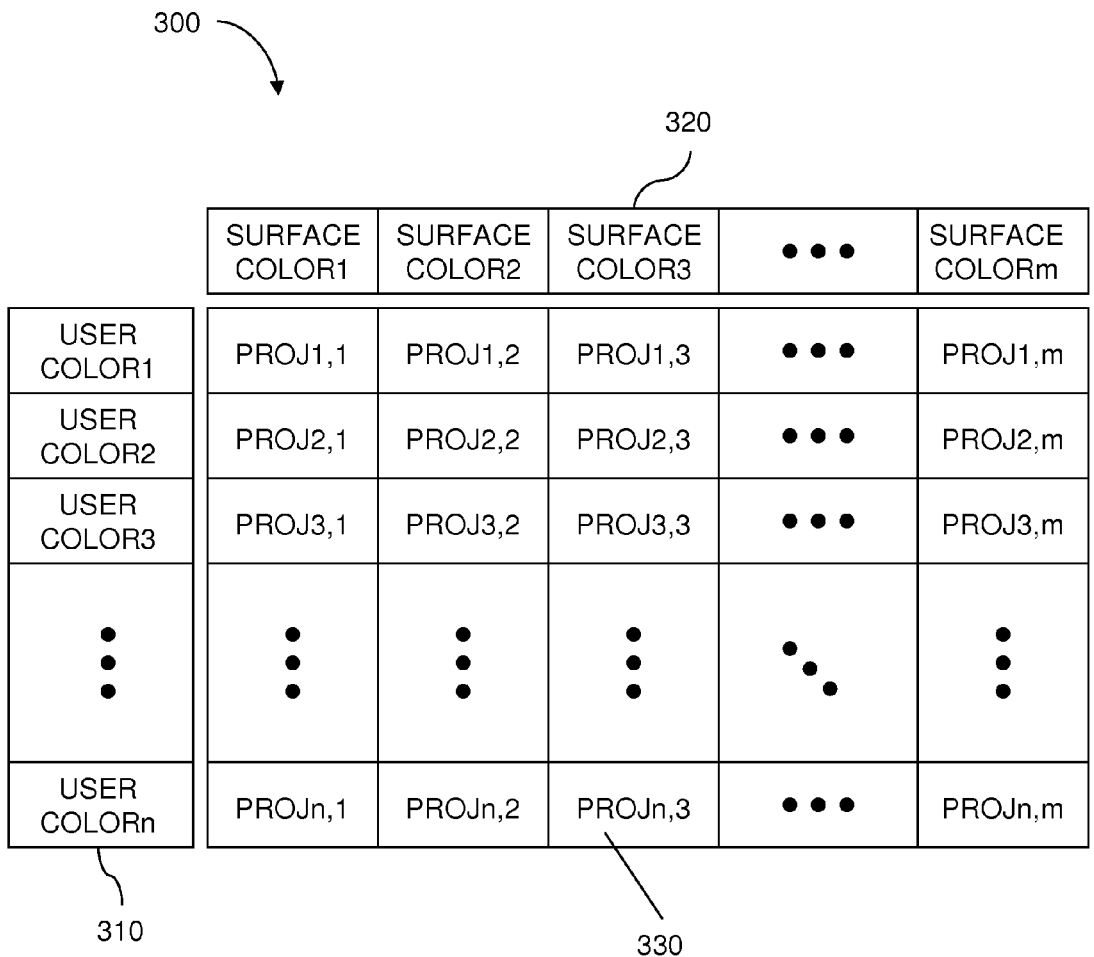
FIG. 3 is a diagram of an embodiment of a lookup table for determining a projection color as a function of surface color and a user-chosen color.

FIG. 3 illustrates an embodiment of a color compensation table 300 stored in memory 170. The table 300 can be loaded into memory 170 as part of a software program executed by the integrated circuit 120 during operation of the apparatus 100. Alternatively, the table 300 can be permanently stored in a non-volatile region of the memory 170. In either case, each row 310 of the table 300 corresponds to a different color available for selection (USER COLOR1, USER COLOR2, etc.). Each column 320 of the table 300 corresponds to a different surface color estimate (SURFACE COLOR1, SURFACE COLOR2, etc.) available for analysis by the integrated circuit 120. Alternatively, the row/column orientation can be reversed. Either way, the table 300 includes an entry 330 for each row and column combination.

Each entry 330 contains predetermined color projection information associated with the corresponding row/column color combination. The information contained in a particular entry 330 represents the projection color that should be projected onto a surface of a particular color to reproduce a particular chosen color. For example, the information (PROJ) contained in the entry 330 associated with the $2^{nd}$ row 310 and $3^{rd}$ column 320 represents the projection color for the second paint color option (USER COLOR2) and the third surface color estimate (SURFACE COLOR3). Accordingly, if a user selects the second paint color option and the surface has a color estimate corresponding to the third surface color estimate, the integrated circuit 120 selects the color information stored at the table entry PROJ2,3. The color information contained in the different entries 330 can be determined in advance for a plurality of paint color and surface color options based on the known characteristics of a particular color space and color model. This reduces the processing load of the integrated circuit 120 during normal operation, freeing the integrated circuit 120 from having to perform color computations in real-time. Instead, the integrated circuit 120 is programmed to perform table lookups as a function of surface color estimate and user-chosen color to determine the appropriate projection color to be projected onto a surface. In one embodiment, the table 300 is implemented as a Content Addressable Memory (CAM) where the user-chosen color and surface color estimate inputs are used to search the table 300 for a matching entry 330.

In some situations, the color chosen by the user may not identically match any of the rows 310 in the table 300 and/or the surface color estimate may not identically match any of the columns 320. Under these conditions, the integrated circuit 120 can select the row 310 nearest the user-chosen color and/or the column 320 nearest the surface color estimate. The corresponding entry 330 contains the projection color data to be displayed by the apparatus 100. In another embodiment, the integrated circuit 120 identifies the table entries 330 associated with the rows 310 between which the chosen color falls and/or the columns 320 between which the surface color estimate falls. The integrated circuit 120 performs an extrapolation based on the data retrieved from the identified entries 330 to determine the projection color. The integrated circuit 120 can average or weight the different values extracted from the entries 330 or apply any other suitable extrapolation algorithm to determine the final projection color. In each case, the color selected by the integrated circuit 120 can be projected onto a surface for display.

In one embodiment, ambient lighting conditions do not distort the surface color estimate generated by the scanner 110 because the surface is scanned with little or no interference from the ambient environment as described above. As such, the color projected by the apparatus 100 is distorted by the ambient environment. This enables the user to view the affect that the surrounding environment has on color choices made by the user because the same color, viewed under different natural or artificial lighting conditions, will look different. The integrated circuit 120 can also modify the projection color based on a surface texture type chosen by the user. In one embodiment, a paint finish type such as matte, satin, flat, eggshell, semi-gloss, gloss, etc. is chosen and the integrated circuit 120 distorts or otherwise modifies the projection color so that it appears with the chosen finish. In an embodiment, the integrated circuit 120 modifies the projection color with patterns associated with a particular finish type. In another embodiment, the integrated circuit 120 adjusts one or more projection parameters (e.g., focus, angle, etc.). For example, a color can be projected out-of-focus so that the color appears to have a matte-type finish or in focus so that the color appears to have a gloss-type finish. In each case, the projection color can be modified by the integrated circuit 120 to have a particular finish type when projected onto the surface.

The apparatus 100 further includes a projector 130 for projecting the color selected by the integrated circuit 120 onto a surface, e.g., as illustrated by Step 220 of FIG. 2. More than one color can be selected for display. Accordingly, the user can evaluate more than one color option. The user can use an I/O (input/output) interface 140 for choosing colors for display. The I/O interface 140 can include a touch screen, touch pad, display, keyboard, light pen, voice response system, etc. The apparatus 100 can also include a database 150 of colors. The user accesses the database 150 using the I/O interface 140 and chooses one or more colors from the database 150 for display.

In another embodiment, the apparatus 100 includes an encoded data scanner 160 for acquiring one or more color selections from an encoded paint card (not shown). In one embodiment, the encoded data scanner 160 is a bar code reader for retrieving paint color data by scanning bar-coded paint cards. Each encoded paint card has one or more paint chip samples and encoded color data associated with each chip sample. The encoded data scanner 160 reads the color data from the encoded paint card and provides the retrieved data to the integrated circuit 120 for processing. The integrated circuit 120 selects an appropriate projection color as described above based on the surface color estimate obtained by the integrated circuit 120 and each color chosen from the database 150 and/or encoded color data obtained by the encoded data scanner 160. Each color selected by the integrated circuit 120 yields the chosen color or a color substantially similar to the chosen color when projected onto the surface by the projector 130. In one embodiment, the user chooses a paint color family (e.g., blues, light blues, dark blues, etc.) and the integrated circuit 120 determines a projection color for each color in the paint color family by comparing the surface color estimate to each color in the family as previously described herein. The different colors selected by the integrated circuit 120 can be individually displayed by the projector 130 in succession or displayed together as a grid of colors.

Figure 4:
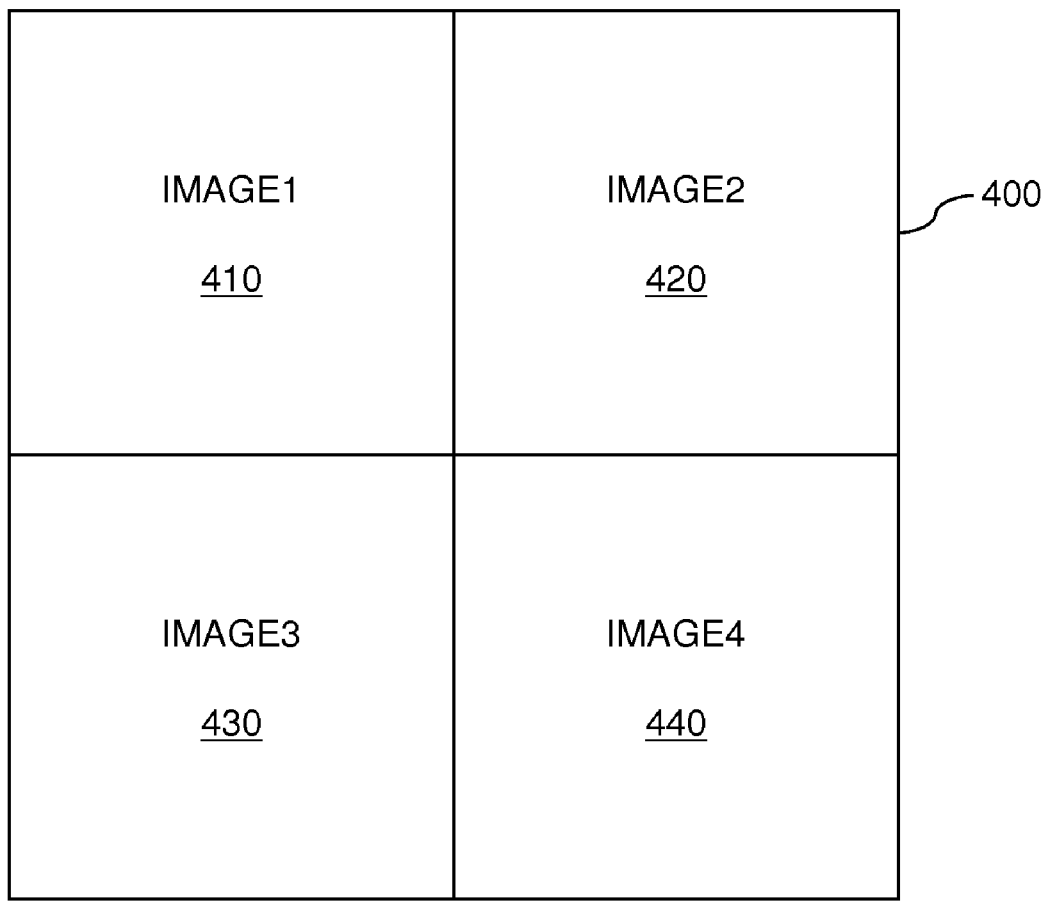
FIG. 4 is a block diagram of an embodiment of a color grid projected onto a surface.

FIG. 4 illustrates an embodiment of a color grid 400 provided from the integrated circuit 120 to the projector 130 for display. The color grid 400 enables the projector 130 to display a plurality of colors at the same time. Each region 410-440 of the color grid 400 corresponds to a different projection color selected by the integrated circuit 120. This enables the user to view different colors side-by-side at the same time. For example, the user can view different hues within the same paint color family where each different hue is projected in one of the grid regions 410-440. FIG. 4 shows four grids 410-440 for ease of illustration only. However, the color grid 400 can be divided into any number of desired regions. In another embodiment, the integrated circuit 120 provides a plurality of projection colors to the projector 130 for display in succession. According to this embodiment, the user views the different colors one at a time. The user can select the amount of time each color is displayed. Optionally, a predetermined or default delay time can be set by the integrated circuit 120. Delay parameters can be stored in the memory 170.

Other information can also be stored in the memory 170. In one embodiment, the memory 170 stores a color gamut for a particular color space. The integrated circuit 120 identifies a color stored in the memory 170 that is closest to the surface color estimate. The integrated circuit 120 then determines a projection color based on the difference between the stored color and one or more colors chosen by a user. This way, the apparatus 100 does not store the surface color data. Instead, the integrated circuit 120 identifies the closest surface color stored in the memory 170, marks the color, e.g., by setting a flag bit in the memory 170, and then deletes the surface color data. In another embodiment, the integrated circuit 120 uses the memory 170 to store one or more color selections made by the user as the user views several different color options projected onto a surface. Each color projected onto a surface that is of interest to a user can be saved in the memory 170. The user can use the I/O interface 140 to indicate when a color should be saved. The user can view each saved color at a later time. This allows the user to evaluate many colors while not having to remember which colors are of interest. The user can also save desirable color options so that they can be displayed at a later time under different lighting conditions.

Those skilled in the art can implement various portions of the description, block diagrams, and operational flows described herein in the form of computer-executable instructions, which may be embodied in one or more forms of computer-readable media. As used herein, computer-readable media may be any media that can store or embody information that is encoded in a form that can be accessed and understood by a computing device. Typical forms of computer-readable media include, without limitation, both volatile and nonvolatile memory, data storage devices, including removable and/or non-removable media, and communications media. The apparatus memory 170 can include any or all of these types or other types of computer-readable media.

Different ones of the apparatus components can be integrated into the same housing or can be stand alone components. In one embodiment, the scanner 110, integrated circuit 120, projector 130 and I/O interface 140 are integrated into a hand-held device (not shown) such as a cell phone, PDA, computer, smart phone, portable computer or other type of portable electronic device. The encoded data scanner 160 can also be integrated into the hand-held device. Alternatively, the projector 130 and scanners 110, 160 can be stand-alone components wired or wirelessly communicatively coupled to the integrated circuit 120. Various other component configurations are within the scope of the embodiments described herein.

With the above range of variations and applications in mind, it should be understood that the present invention is not limited by the foregoing description, nor is it limited by the accompanying drawings. Instead, the present invention is limited only by the following claims and their legal equivalents.

What is claimed is:
1. An apparatus, comprising:
a projector configured to project one or more colors onto a surface; and
an integrated circuit associated with the projector and configured to process an estimate of a color of the surface and select a projection color as a function of the surface color estimate and a chosen color so that the projection color yields the chosen color or a color substantially similar to the chosen color when projected onto the surface by the projector.

2. The apparatus of claim 1, further comprising a scanner associated with the integrated circuit and configured to generate the surface color estimate.

3. The apparatus of claim 1, wherein the integrated circuit is configured to select a plurality of projection colors as a function of the surface color estimate and a plurality of chosen colors so that each projection color yields the corresponding chosen color or a color substantially similar to the corresponding chosen color when projected onto the surface by the projector.

4. The apparatus of claim 3, wherein the integrated circuit is configured to compare the surface color estimate to a plurality of different colors included in a chosen paint color family.

5. The apparatus of claim 3, wherein the integrated circuit is configured to provide the plurality of projection colors as a color grid where each region of the color grid corresponds to a different one of the projection colors.

6. The apparatus of claim 3, wherein the integrated circuit is configured to provide the plurality of projection colors to the projector for display in succession.

7. The apparatus of claim 1, wherein the integrated circuit is configured to modify the projection color based on a chosen surface texture type.

8. The apparatus of claim 1, wherein the integrated circuit is configured to analyze the surface color estimate and the chosen color in a color space associated with the chosen color.

9. The apparatus of claim 1, wherein the integrated circuit is configured to analyze the surface color estimate and the chosen color in a paint color space.

10. The apparatus of claim 1, wherein the integrated circuit is configured to store one or more color selections made by a user.

11. The apparatus of claim 1, wherein the integrated circuit is configured to identify at least one entry in a table associated with the surface color estimate and the chosen color and select the projection color based on information obtained from the at least one entry.

12. The apparatus of claim 1, further comprising an encoded data scanner configured to acquire the chosen color from an encoded paint card.

13. The apparatus of claim 1, wherein the integrated circuit is configured to obtain the chosen color responsive to one or more colors being selected from a color database.

14. One or more computer-readable media containing executable instructions that, when executed, cause an integrated circuit to process an estimate of a surface color and select a projection color as a function of the surface color estimate and a chosen color so that the projection color yields the chosen color or a color substantially similar to the chosen color when projected onto the surface.

15. A method, comprising:
processing an estimate of a surface color;
selecting a projection color as a function of the surface color estimate and a chosen color so that the projection color yields the chosen color or a color substantially similar to the chosen color when projected onto the surface; and
projecting the projection color onto the surface.

16. The method of claim 15, comprising selecting a plurality of projection colors as a function of the surface color estimate and a plurality of chosen colors so that each projection color yields the corresponding chosen color or a color substantially similar to the corresponding chosen color when projected onto the surface.

17. The method of claim 16, comprising projecting the plurality of projection colors as a color grid where each region of the color grid corresponds to a different one of the projection colors.

18. The method of claim 15, comprising analyzing the surface color estimate and the chosen color in a paint color space.

19. The method of claim 15, comprising obtaining the chosen color from an encoded paint card.

20. The method of claim 15, comprising:
identifying one or more entries in a table corresponding to the surface color estimate and the chosen color; and
selecting the projection color based on information obtained from the at least one entry.

* * * * *